United States Patent [19]

Linhart

[11] Patent Number: 4,961,213
[45] Date of Patent: Oct. 2, 1990

[54] X-RAY APPARATUS COMPRISING A FILM CASSETTE WHICH IS DISPLACEABLE IN A CARRIAGE

[75] Inventor: Claud H. Linhart, Hamburg, Fed. Rep. of Germany

[73] Assignee: U. S. Philips Corporation, New York, N.Y.

[21] Appl. No.: 314,014

[22] Filed: Feb. 22, 1989

[30] Foreign Application Priority Data

Feb. 22, 1988 [DE] Fed. Rep. of Germany ....... 3805409

[51] Int. Cl.[5] ............................................. G03B 42/02
[52] U.S. Cl. .................................... 378/181; 378/172; 378/173
[58] Field of Search ............... 378/172, 173, 174, 181, 378/167

[56] References Cited

U.S. PATENT DOCUMENTS

| | | | |
|---|---|---|---|
| 3,829,698 | 8/1974 | Goetz | 378/181 |
| 3,848,134 | 11/1974 | Gieschen et al. | 378/181 |
| 4,199,687 | 4/1980 | Brendl et al. | 378/187 |
| 4,489,428 | 12/1984 | Schwieker | 378/181 |
| 4,539,696 | 9/1985 | Walling et al. | 378/181 |
| 4,845,734 | 7/1989 | Maki et al. | 378/181 |

FOREIGN PATENT DOCUMENTS 2226473 12/1973 Fed. Rep. of Germany .
3236081 3/1984 Fed. Rep. of Germany ...... 378/181

Primary Examiner—Carolyn E. Fields
Assistant Examiner—David P. Porta
Attorney, Agent, or Firm—William Squire

[57] ABSTRACT

An X-ray apparatus includes a film cassette which is displaceable in a carriage in the loading direction, a device for fixing the cassette position perpendicularly to the loading direction, two pairs of guide rollers which are offset with respect to one another in the loading direction and which are mounted on the carriage and on the apparatus, respectively, and independently controlled motor drives which act on the film cassette by way of a traction means guided via the rollers, the traction means sections between the rollers on the carriage and the rollers on the apparatus extending parallel to one another. The carriage for the film cassette can be transported by two similar motor drives in that the traction means forms a closed loop and is guided from one roller of a roller pair mounted on the apparatus to the other roller via, each time, one of the roller pairs on the cassette, in that the loop is coupled to the device for fixing the cassette position, and in that the two simultaneously activatable motor drives on traction means sections, or transport rollers on the apparatus, wherebetween there is situated at least one roller which is not connected to the apparatus.

18 Claims, 2 Drawing Sheets

X-RAY APPARATUS COMPRISING A FILM CASSETTE WHICH IS DISPLACEABLE IN A CARRIAGE

BACKGROUND OF THE INVENTION

1. Field of the Invention

The invention relates to an X-ray apparatus, comprising a film cassette which is displaceable in the loading direction in a carriage, a device for fixing the cassette position perpendicularly to the loading direction, two respective pairs of guide rollers which are arranged so as to be off-set with respect to one another in the loading direction on the apparatus and on the carriage, respectively, and independently controlled motor drives which act on the film cassette via a traction means guided via the rollers, the traction means sections between the rollers on the carriage and the rollers on the apparatus extending parallel to one another.

2. Description of the Prior Art

An X-ray apparatus of this kind is known from DE-AS 22 26 473. Therein, a first electric motor acts on one of the guide rollers, thus displacing the film cassette perpendicularly with respect to the loading direction. The displacement of the cassette carriage in the loading direction is realised by way of an additional traction means loop which is guided via two guide rollers which are arranged so as to be off-set in the loading direction with respect to one another, and one of which can be driven by a second electric motor. For an X-ray exposure, the carriage with the film cassette must be displaced a comparatively long distance from the parking position to the exposure position. The displacement of the cassette in the direction perpendicular to the loading direction, necessary in the case of an X-ray exposure with a vertical sub-division of the exposure format, however, is comparatively short; moreover, this displacement does not concern said carriage because the displacement of the carriage to the exposure position and the possibly required displacement of the film cassette in the carriage must take place at least substantially simultaneously, so that the second electric motor must have a substantially higher power rating than the first electric motor.

SUMMARY OF THE INVENTION

It is an object of the invention to provide an X-ray apparatus of the kind set forth so that two similar electric motors having a comparatively low power rating can be used. This object is achieved in accordance with the invention in that the traction means forms a closed loop, and is guided each time from one roller of a pair of rollers mounted on the apparatus to the other roller via one of the pairs of rollers on the carriage, the loop being coupled to the device for fixing the cassette position, the two simultaneously activatable motor drives acting traction means sections, or on transport rollers mounted on the apparatus, wherebetween there is situated at least one roller which is not secured to the apparatus.

In accordance with the invention, both motor drives are simultaneously active; consequently, each motor need be designed for half the drive power only. When the two motor drives are coupled to a respective one of the guide rollers secured to the apparatus (which may not be interconnected by way of a traction means section), the length of the traction means sections between one pair of rollers secured to the apparatus and the associated pair of rollers on the carriage becomes smaller, the length of the traction means sections between the other roller pair secured to the apparatus and the other roller pair on the carriage being increased accordingly, so that the carriage is displaced in the loading direction. When the direction of rotation of the two motor drives is reversed, displacement takes place in the opposite direction.

For the traction means use is preferably made of plastics toothed belts; however, other traction means can also be used, for example a cord or the like. It is also possible to interconnect different traction means, for example a cord and a toothed belt in a common loop. "Traction means section" is to be understood to mean herein the section of a traction means between two guide rollers. The term "guide rollers" must be broadly interpreted; it is to be understood to include also, for example stationary pins (guide pins) which have a preferably circular cross-section and around which the traction means can be pulled with little effort.

When the device for fixing the cassette position is formed by an auxiliary carriage which is secured to the carriage so as to be displaceable perpendicularly with respect to the loading direction, the auxiliary carriage or the cassette connected thereto can be displaced perpendicularly to the loading direction when the motor drives operate in the same sense. A preferred embodiment, however, consists in that the device for fixing the cassette position comprises a pair of clamping jaws which is mounted on the carriage so as to be displaceable perpendicularly to the loading direction in the same and in the opposite sense, the two clamping jaws being coupled to a respective one of the traction means sections between the guide roller pairs on the carriage. This construction enablesening and closing of the clamping jaws accommodating the cassette.

In this embodiment the cassette can again be displaced perpendicularly to the loading direction when the lengths of the loop sections situated on both sides of a central line extending in the loading direction can be changed in the opposite sense.

In a preferred version of this embodiment the traction means is guided from a roller on the apparatus, via a roller which is secured to the auxiliary carriage which is displaceable between the relevant roller and the other roller of the pair to the roller pair mounted on the carriage, the auxiliary carriage comprising a coupling whereby the two guide rollers arranged on the auxiliary carriage can be coupled to one another so that the motion of one roller is imparted to the other roller.

This embodiment enables three motions to be performed by means of only two motor drives: displacement of the carriage in the loading direction, displacement of the cassette in the direction perpendicular thereto (by displacement in the same direction of the clamping jaws) and the opening and closing of the clamping jaws (when the cassette is inserted and removed, respectively).

The invention will be described in detail hereinafter with reference to the drawing. Therein:

DETAILED DESCRIPTION OF THE PREFERRED EMBODIMENTS

Figure 1:
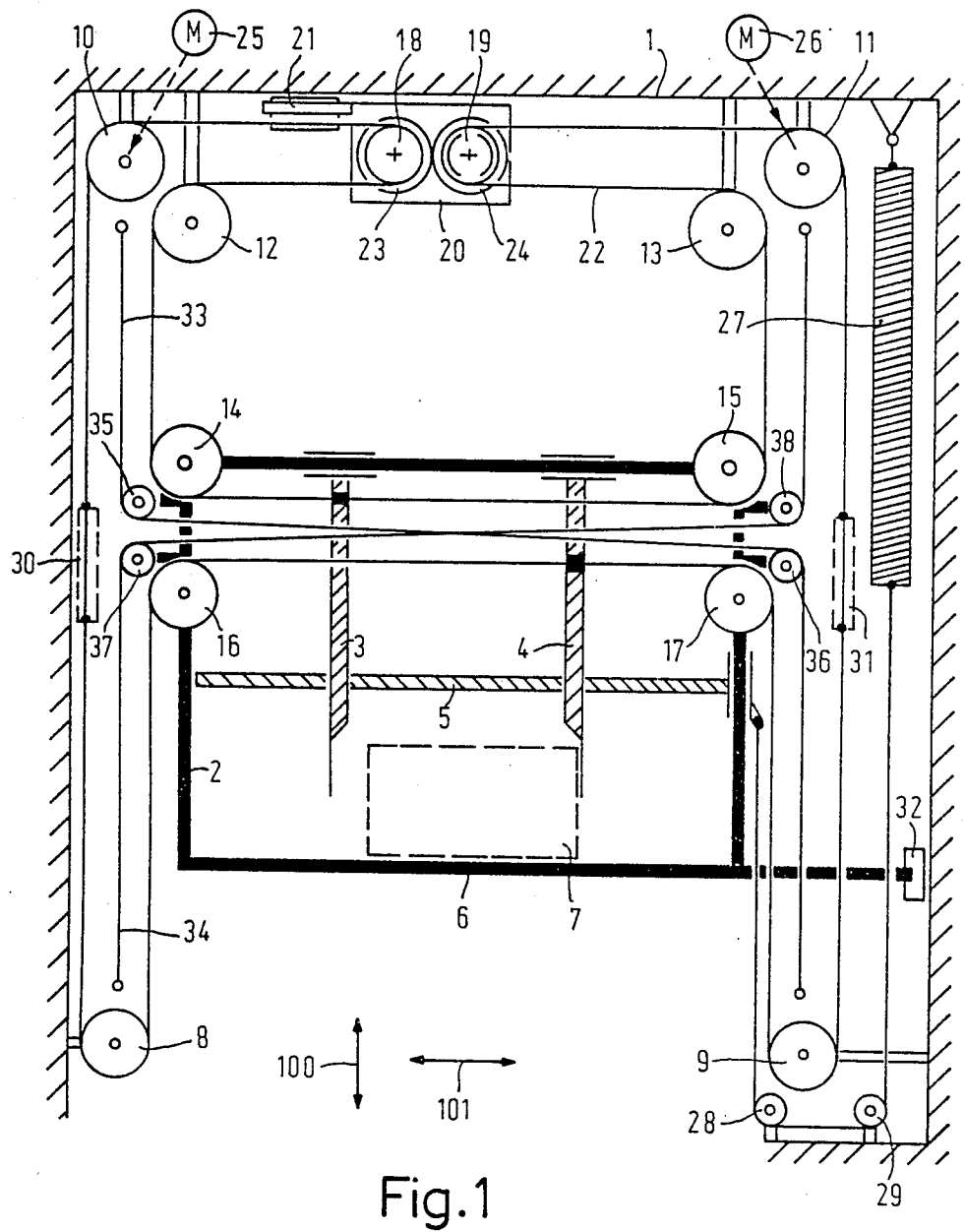
FIG. 1 shows a preferred embodiment in accordance with the invention.

The reference numeral 1 in FIG. 1 denotes an X-ray spot film apparatus, only the outer contour of which is indicated for the sake of clarity. The apparatus is shown in the position rotated through 90° with respect to the normal operating position. The loading direction denoted by the arrow 100 thus extends, in reality, horizontally instead of vertically, while the direction denoted by the arrow 101 extends vertically in the upright position of the X-ray apparatus.

Inside the X-ray apparatus there is arranged a carriage 2 which is displaceable in the loading direction (arrow 100); the guides required for this purpose are not shown. On the carriage there are provided two clamping jaws 3 and 4 which are adjustable perpendicularly to the loading direction as well as a clamping jaw 5 which extends perpendicularly to the loading direction and which is arranged so as to be displaceable in the loading direction, which clamping jaw 5 cooperates with a clamping jaw 6 permanently secured to the carriage 2. The clamping jaws 3 . . . 6 serve to hold a cassette 7 which is diagrammatically shown.

The clamping of the clamping jaws 3 and 4, the displacement of the film cassette, clamped therein, perpendicularly to the loading direction and the displacement of the cassette carriage 2 in the loading direction (100) is realised by way of two motor drives which act on the carriage and the clamping jaws 3, 4 via a number of rollers and suitable guiding of the traction means.

At the loading side of the X-ray apparatus (being situated at the left hand side in practice instead of at the bottom) there is secured a first pair of guide rollers 8, 9. Offset with respect thereto in the loading direction, i.e. at the other end of the apparatus, there is provided a second roller pair 10, 11. At the same side of the X-ray apparatus, be it further inwards, there is a third or pair of rollers 12, 13 secured to the apparatus. On the carriage itself there are also provided two pairs of rollers 14, 15 and 16, 17, and a further roller pair 18, 19 is provided on an auxiliary carriage 20 which is displaceable in the direction 101 and which can be locked by means of a locking brake 21. The axes of each roller pair, extending perpendicularly with respect to the plane of drawing, are situated on a respective straight line extending parallel to the direction 101. A suitable traction means, for example a belt 22 which is preferably constructed as a toothed belt, is guided as a closed loop on the rollers. Via the rollers 8, 10 the belt 22 is guided to the one roller 18 on the auxiliary carriage 20 and further, via the roller 12 on the apparatus, to one roller pair 14, 15 on the carriage 2, and further to the other roller 13 of the third roller pair of the apparatus and, via the other roller 19 on the auxiliary carriage, to the two rollers 11 and 9 on the apparatus and the roller pair 16 and 17, back to the roller 8 again. Thus, the guiding is such that the rollers of a roller pair on the apparatus (for example 10, 11) are not directly connected to one another by the loop, but always via a roller pair (in this case 14, 15) on the carriage 2. The rollers are arranged so that the traction means sections, i.e. the sections of the loop between the rollers, extend either in the direction of the arrow 100 or in the direction of the arrow 101. The traction means section of the loop between the rollers 14 and 15 is connected to the clamping jaw 3 and the traction means section between the rollers 16 and 17 is connected to the clamping jaw 4.

The rollers 18, 19 can be coupled to one another via a coupling device so that the rotation of one roller is imparted onto the other roller. To this end, gearwheels 23, 24 may be arranged on the roller shafts, one gearwheel (for example 23) being rigidly connected to the associated roller 18 whilst the other gearwheel can be rigidly connected to the roller 19 via an electromagnetic coupling (not shown), the latter gearwheel, however, also being movable independently of the roller 19 when the coupling is released.

As is diagrammatically shown, the rollers 10 and 11 are driven by an electric motor 25, 26, respectively. The electric motors can also act on other rollers mounted on the apparatus, for example on the rollers 8, 9 or 12, 13 or on the rollers 10 and 13 or 10 and 12. Similarly, the electric motors can also act directly on the toothed belt sections. In all these cases it is important, however, that between the locations where the electric motors act, be it guide rollers or traction means section, there is arranged at least either one of the guide rollers 18, 19 or one of the rollers pairs 14, 15 or 16, 17 on the carriage. Consequently, the motors may not be coupled, for example to the rollers 8 and 10 because these rollers are directly interconnected by a traction means section.

The clamping jaws 3, 4 are fully opened for the loading of a cassette, and the carriage 2 is displaced fully in the loading direction, i.e. to the bottom in the drawing. When the cassette is inserted, the clamping jaw 5 is pressed upwardly toward the top of the drawing against the force of a spring 27, connected to the clamping jaw 5 via rollers 28 and 29, until the cassette is positioned between the clamping jaws 5 and 6.

Subsequently, the clamping jaws 3, 4 are moved towards one another. To this end, the rollers 18, 19 are uncoupled from one another (i.e. the coupling is released) and the two rollers 10 and 11 are driven counterclockwise by the electric motors. In order to ensure that the clamping jaws 3, 4 move symmetrically towards one another, the auxiliary carriage 20 is locked by the locking brake 21.

Subsequently, the carriage 2 is displaced fully to the right top in the drawing to the so-called parking position. To this end, the rollers 18, 19 are coupled to one another by-energising a magnetic coupling, (not shown) and the rollers 10 and 11 are driven at the same speed but in the opposite sense (the roller 10 is driven counterclockwise and the roller 11 is driven clockwise). As a result, the length of the traction means section between the rollers 8 and 16, and 9 and 17, is increased by an amount which equals the amount whereby the traction means section between the rollers 12 and 14, and 13 and 15, respectively is, decreased, so that the carriage is displaced in the loading direction.

When an exposure is to be made at a later instant, the carriage 2 is moved in one of directions 100; toward the bottom of the drawing over a given distance which is determined inter alia by the format of the cassette; to this end, the motors are again driven at the same speed but in the opposite sense as before (roller 10 in the clockwise direction, roller 11 in the counterclockwise direction). When the cassette is to be displaced in the transverse directions 101 during such an exposure, the two rollers 10 and 11 are driven at the same speed but also in the same sense, the coupling still being activated. As a result, depending on the direction of rotation, the auxiliary carriage 20 is displaced either towards the roller 10 or towards the roller 11 (during this rotation the transport rollers 18, 19 hardly rotate), causing displacement of the two clamping jaws 3, 4 in unison in one or the other of opposite directions 101.

The two displacement procedures for the cassette (in the direction 100 and 101) need not take place successively as described before. When the rollers 10 and 11 are driven at different speeds, with an activated coupling, a displacement component in one of the directions of the arrow 100 is always accompanied by a component in one of the directions of the arrow 101, so that simultaneous displacement is possible in the directions 100 and 101.

It follows from the foregoing that the coupling need be released only for the opening or closing of the clamping jaw 3. The rollers 18, 19 otherwise remain coupled to one another, so that the clamping jaws 3, 4 keep the cassette 7 clamped. For all operations, but notably for the displacement of the carriage 2 in the direction of the arrow 100, both motors 25 and 26 are active. Therefore they may be of the same construction type and their drive power may be lower, for the same circumstances, than that of a drive in which the displacement in the loading direction is relised by way of only one motor.

When the carriage with the cassette is to be displaced from its parking position to the exposure position within a comparatively short period of time, comparatively high forces occur during acceleration and deceleration, which forces may shake the X-ray apparatus. Such shaking can be eliminated by including two compensating members in the traction means sections between the rollers 8 and 10, and 9 and 11, the mass of the compensating members being equal and amounting to half the sum of the masses of the carriage 2 and the cassette 7. When the cassette carriage is displaced in the loading direction, the two masses are accelerated or decelerated in opposite directions, so that the reactive forces exerted on the X-ray apparatus during the acceleration and deceleration of the carriage 6 are compensated for. When the clamping jaws 3, 4 and the cassette situated therein are displaced in the same sense, the two compensating members are displaced in the opposite direction. In order to prevent the spring 27 from pulling the clamping jaw 5 and hence the carriage 2, in the direction of the loading side, the carriage 2 is provided with a locking brake 32.

The angular positions of the rollers 10, 11, 12 and 13 depend on the position of the carriage 2, on the opening of the clamping jaws, and on the position thereof with respect to a reference line extending in the loading direction, i.e. on the position of the cassette with respect to the carriage. By measurement of the angular position of the transport rollers, for example by means of a respective potentiometer or encoder thereto, the position of the cassette and the opening of the clamping jaws, i.e. the dimension of the cassette in the direction of the arrow 101, can thus be measured.

When the cassette is displaced in the direction of arrow 101, for example, the angular position of the rollers 10 and 12 change in the same sense. The sum of these angular positions is, therefore, proportional to the displacement in the direction 101. On the other side, the rollers 10 and 11 are adjusted in the opposite sense when the carriage is displaced in the direction of the arrow 100; therefore the difference between these angular positions is proportional to the displacement of the cassette carriage 2 in the direction of the arrow 100. When the clamping jaws 3, 4 are opened or closed, the angular position of the rollers 11 and 12 changes in the opposite sense; the opening or closing position of the clamping jaws can thus be determined by measurement of the angular position of the rollers 11 and 12 by means of a suitable angle detector. The various measurement values, therefore are not determined by a single angular quantity; however, they can be unambiguously determined, both as regards magnitude and sign, from the difference between or the sum of the angular positions of each time two of a total of three rollers.

When the cassette is clamped, an asymmetrical variation of the traction force occurs, which may tilt the carriage 2. This can be prevented by using a stable guide (not shown) for the carriage 2 in the direction of the arrow 100. The requirements imposed as regards the guiding accuracy can become less severe by guiding symmetrically arranged, fixed rope sections 33, 34 via each time two guide rollers 35 and 36, 37 and 38, respectively, secured to the carriage, so that oppositely directed and hence compensating moments are exerted on the carriage.

Figure 2:
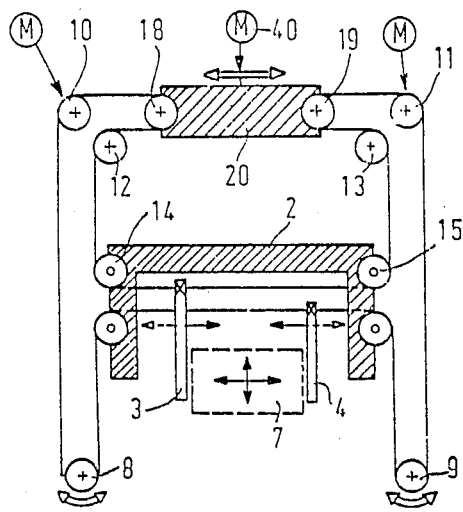
FIGS. 2 to 5 show partly simpler, partly more complex versions of this embodiment.

In the arrangement shown in FIG. 1 three functions can be performed by means of two electric motors; however, in any case two functions can be simultaneously performed. An in this respect more effective arrangement is shown in FIG. 2. It deviates from that shown in FIG. 1 in that the carriage 20 is driven by an additional motor 40 and in that the rollers 18, 19 mounted thereon cannot be coupled to one another. All three functions can thus be simultaneously performed.

Figure 3:
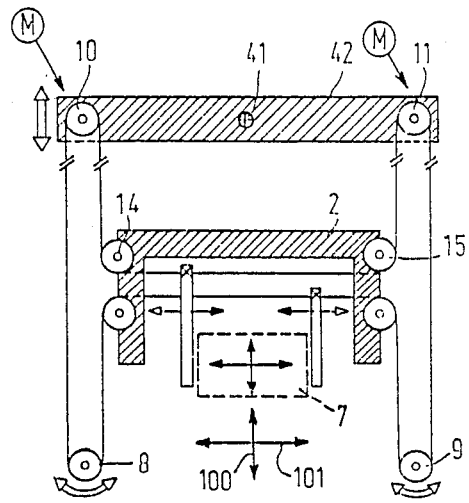

FIG. 3 shows a further version of this embodiment. Instead of the carriage 20 on the X-ray apparatus there is provided a dual-arm lever 42 which is pivotable about the axis 41 and on which there are mounted the rollers 10 and 11. The rollers 10 and 11 are connected, via a single, respective cord section, to the rollers 14 and 15 respectively, on the carriage 2; the rollers 12, 13 on the apparatus and the rollers 18, 19 can thus be dispensed with. Displacement of the cassette in the direction denoted by the double arrow 101 is enabled by pivoting the lever 42 about the axis 41 by means of an electric motor (not shown). This embodiment and the embodiments shown in the FIGS. 1 and 2 have in common that the length of two cord sections (in this case about the rollers 10 and 11) can be varied in the opposite sense for displacement of the cassette 7 in the direction 101.

Figure 4:
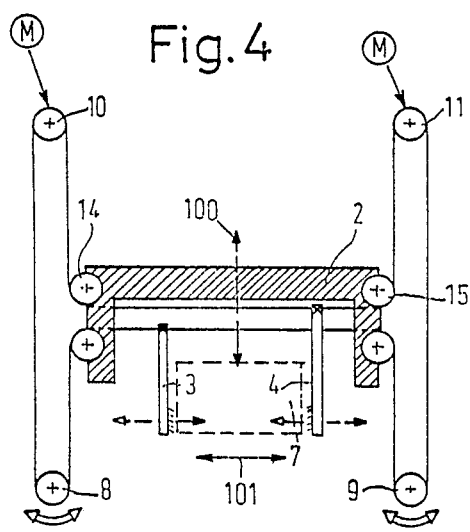

The embodiment shown in FIG. 4 and the embodiment shown in FIG. 3 have in common that the rollers 10 and 11 are directly connected to the rollers 14 and 15 on the carriage 2 via only one traction means section. Because the rollers 10 and 11, however, are secured to the X-ray apparatus and because an auxiliary carriage (20) for changing the length of the loops around the rollers is absent, the cassette cannot be displaced in the direction 101 in this embodiment. Using the motor drives, acting on the rollers 10, 11 and also on the rollers 8, 9 or the rollers 9, 10 (but not on the rollers 10 and 8 or 9 and 11), therefore, only two functions can be realised: the opening and closing of the clamping jaws 3, 4 and the displacement of the carriage 2 in the direction of the double arrow 100. Such an arrangement is useful for X-ray apparatus in which it is not necessary to subdivide the cassette format in the vertical direction, thus eliminating the necessity of displacement of the cassette in the direction 101, for example in a Bucky apparatus in which the film cassette need merely be displaced from the loading position to the exposure position.

Figure 5:
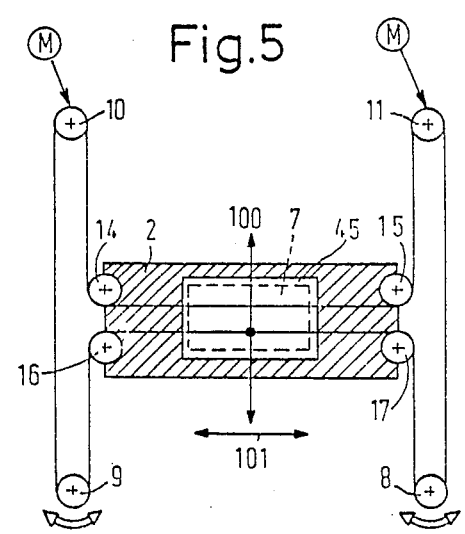

The embodiment shown in FIG. 5 deviates from that shown in FIG. 4 in that for the displacement of the cassette in the direction 101 there is provided an auxiliary carriage 45 for the cassette, which auxiliary carriage is arranged so as to be displaceable in the direction 101 on the carriage 2 (in a manner not shown). This auxiliary carriage is connected to one of the two traction means sections between the rollers 14, 15 or 16, 17. Such an apparatus enables two dimensional positioning of the film cassette, i.e. in the directions 100 and 101; for the clamping of the cassette there must be provided a separate mechanism which is not shown in FIG. 5.

FIGS. 4 and 5 clearly illustrate the H-shaped cord drive which enables the displacement of the cassette carriage 2 by means of two drive motors.

What is claimed is:

1. In an X-ray apparatus, the combination comprising:
   a support,
   a carriage for a film cassette displaceable in a load direction,
   a cassette clamp device for positioning the cassette perpendicularly to the load direction,
   a plurality of pairs of guide rollers offset with respect to one another in the load direction on the support and on the carriage,
   independently controlled motor drives which act on the clamp device via an endless loop traction means set forth guided via the rollers, the traction means sections between the rollers on the carriage being parallel to one another and between the rollers on the support being parallel to one another, and
   the endless loop traction means forming a closed loop which is movable relative to said support throughout the loop guided from one roller of a roller pair mounted on the support to the other roller of the pair via one of the pairs of rollers on the carriage, the loop being coupled to the clamp device for fixing the cassette position, two motor drives acting on the traction means via the rollers on the support, between said rollers on said support there being situated at least one roller which is not secured to the support.

2. The combination as claimed in claim 1 wherein the combination comprises an auxiliary carriage including at least one roller and is displaceable transverse to the loading direction, one of the traction means sections between the rollers of a roller pair mounted on the carriage being coupled to the auxiliary carriage.

3. The combination as claimed in claim 1 wherein the combination comprises a pair of clamping jaws which are arranged so as to be displaceable on the carriage, traverse to the load direction, in the same or in the opposite sense, the two clamping jaws being coupled to a respective different traction means section between different respective guide roller pairs on the carriage.

4. The combination as claimed in claim 3 wherein said traction means, drive means and rollers are arranged so that the length of the traction means loop sections situated on both sides of a centre line extending in the load direction can be changed in the opposite sense, with respect to one another.

5. The combination as claimed in claim 4 including a lever pivotally connected to the support and pivotable about an axis extending through the center of the carriage in the load direction, said lever having a pair of arms, a pair of said rollers being on said arms in spaced relation.

6. The combination as claimed in claim 2 wherein the traction means loop is guided from a roller on the support via at least one roller secured to the auxiliary carriage which carriage is displaceable between the roller pair of the support, said loop being guided from the at least one roller to a corresponding one of the roller pair mounted on the cassette carriage.

7. The combination as claimed in claim 6 wherein the traction means loop is guided from one of the guide rollers on the auxiliary carriage, via each time one of the rollers of one of the support roller pairs, to the rollers mounted on the cassette carriage.

8. The combination as claimed in claim 6 wherein the auxiliary carriage is displaceable perpendicularly to the loading direction by means of said motor drives.

9. The combination as claimed in claim 5 wherein the auxiliary carriage comprises coupling means whereby auxiliary carriage includes a pair of loop guide rollers coupled to one another by said coupling means so that the movement of one of the latter rollers is imparted to the other roller.

10. The combination as claimed in claim 9 including a locking brake for locking the auxiliary carriage.

11. The combination as claimed in claim 3 including means for determining the opening position of the clamping jaws, their position in the load direction and in the transverse direction, said means for determining including means for measuring the absolute angles of rotation for at least three guide rollers mounted on the support, the values corresponding to said determined positions being determined by a combination each time of at least two measurement values.

12. In an X-ray apparatus, an X-ray film cassette clamp and transport system comprising:
    a base;
    a carriage movably secured to the base for displacement in first directions;
    a plurality of cassette clamp jaws secured to said carriage for clamping a cassette to said carriage;
    a first set of rollers rotatably secured to the base in spaced relation for guiding traction means;
    a second set of rollers rotatably secured to the carriage in spaced relation for guiding said traction means;
    endless closed loop traction means movably secured relative to said base throughout the loop via engagement with said first and second sets of rollers and coupled to certain of said jaws; and
    drive means for selectively driving certain of said first set of rollers ro selectively displace said carriage in said first directions and selectively cause said jaws to clamp said cassette to said carriage.

13. The system of claim 12 wherein certain of said jaws are movable in second opposing directions transverse said first directions and further including auxiliary carriage means movably secured to said base via roller means rotatably secured to said auxiliary carriage means and engaged with said traction means to selectively displace said certain jaws in said second directions in unison and thereby the clamped cassette in response to said drive means driving said certain rollers.

14. The system of claim 13 wherein said first set of rollers includes two pairs of rollers rotatably secured to the base in spaced relation, a first pair adjacent to one side of the carriage and a second pair adjacent to the opposing side of the carriage, said second set of rollers including two pairs of rollers rotatably secured to the carriage, one pair on said one carriage side and the other pair on the opposing carriage side.

15. The system of claim 14 wherein said drive means includes brake means for selectively braking said traction means at predetermined positions along said traction means.

16. The system of claim 15 wherein said brake means includes a first brake engaged with the traction means between said first pair of rollers, a second brake engaged with the traction means between said second pair of rollers and a third brake engaged with the traction means between one of said auxiliary carriage rollers and a roller of one of said first and second pairs.

17. The system of claim 12 wherein said jaws include a first jaw pair movable in opposing directions, said drive means including means arranged to selectively displace the traction means in a first mode in which the jaws of the first jaw pair are moved by said traction means in opposing directions to clamp and release the cassette thereto and in a second mode in which the jaws of the first jaw pair are moved in unison to displace a clamped cassette in said opposing directions.

18. The system of claim 17 including a second pair of jaws for clamping the cassette thereto in directions transverse said opposing directions, said second pair of jaws being secured to said carriage and responsive to the displacement of said carriage for placement in their clamped and released state.

* * * * *